(12) United States Patent
Frampton

(10) Patent No.: US 9,787,099 B2
(45) Date of Patent: Oct. 10, 2017

(54) AUTOMATIC DIAGNOSIS OR REPAIR FOR A GENERATOR CONTROLLER

(71) Applicant: Kohler Co., Kohler, WI (US)

(72) Inventor: Isaac S. Frampton, Strattanville, PA (US)

(73) Assignee: Kohler, Co., Kohler, WI (US)

( * ) Notice: Subject to any disclaimer, the term of this patent is extended or adjusted under 35 U.S.C. 154(b) by 912 days.

(21) Appl. No.: 14/025,499

(22) Filed: Sep. 12, 2013

(65) Prior Publication Data

US 2015/0069858 A1    Mar. 12, 2015

(51) Int. Cl.
    *H02J 3/44* (2006.01)
    *H02H 11/00* (2006.01)
    *H02J 3/38* (2006.01)
    *H02J 3/46* (2006.01)
    *H02J 1/10* (2006.01)

(52) U.S. Cl.
CPC ............ *H02J 3/44* (2013.01); *H02H 11/004* (2013.01); *H02J 3/38* (2013.01); *H02J 3/46* (2013.01); *H02J 1/10* (2013.01); *Y10T 307/839* (2015.04)

(58) Field of Classification Search
CPC ... H02H 11/004; H02J 3/38; H02J 3/44; H02J 3/46; H02J 1/10; Y10T 307/839
See application file for complete search history.

(56) References Cited

U.S. PATENT DOCUMENTS

| | | | |
|---|---|---|---|
| 3,218,485 A * | 11/1965 | Takai | H02H 11/004 307/127 |
| 4,403,292 A | 9/1983 | Ejzak et al. | |
| 4,761,563 A * | 8/1988 | Ross | H02J 3/38 307/64 |
| 5,266,838 A | 11/1993 | Gerner | |
| 5,422,778 A | 6/1995 | Good et al. | |
| 5,497,332 A | 3/1996 | Allen et al. | |
| 5,621,254 A | 4/1997 | Takeda et al. | |
| 5,737,168 A | 4/1998 | Baker | |

(Continued)

FOREIGN PATENT DOCUMENTS

| | | |
|---|---|---|
| JP | 2001028848 | 1/2001 |
| WO | WO2013053987 | 4/2013 |

OTHER PUBLICATIONS

European Search Report cited in EP14171973.2, dated Mar. 4, 2015.
(Continued)

*Primary Examiner* — Rexford Barnie
*Assistant Examiner* — Elim Ortiz
(74) *Attorney, Agent, or Firm* — Lempia Summerfield Katz LLC

(57) ABSTRACT

A set of generators are connected in parallel using an electrical bus. One of the generators includes selectively connected inputs including a first input associated with a generator and a second input associated with the bus. A controller is configured to receive a first electrical characteristic from the first input assigned to a first connection and a second electrical characteristic from the second input assigned to a second connection. The controller is configured to generate a switching signal to assign the first input to the second connection or assign the second input to the first connection in response to a difference between the first electrical characteristic and the second electrical characteristic exceeding a threshold.

18 Claims, 15 Drawing Sheets

(56) References Cited

U.S. PATENT DOCUMENTS

| | | | |
|---|---|---|---|
| 6,104,171 A | 8/2000 | Dvorsky et al. | |
| 6,281,664 B1 | 8/2001 | Nakamura et al. | |
| 6,555,929 B1 | 4/2003 | Eaton et al. | |
| 6,639,331 B2 | 10/2003 | Schultz | |
| 6,745,083 B2 | 6/2004 | Eckardt et al. | |
| 6,844,706 B2* | 1/2005 | Pinkerton, III | H02J 7/1446 290/52 |
| 6,912,671 B2 | 6/2005 | Christensen et al. | |
| 7,138,729 B2 | 11/2006 | Bailey | |
| 7,415,377 B2 | 8/2008 | Klijn et al. | |
| 7,489,138 B2 | 2/2009 | Yu et al. | |
| 7,619,324 B2 | 11/2009 | Folken et al. | |
| 7,868,621 B2 | 1/2011 | Liu et al. | |
| 7,952,306 B2 | 5/2011 | Wright et al. | |
| 8,120,206 B2 | 2/2012 | Myroth et al. | |
| 8,198,753 B2 | 6/2012 | Algrain | |
| 8,400,001 B2 | 3/2013 | Eaton et al. | |
| 2009/0108678 A1* | 4/2009 | Algrain | H02J 3/005 307/87 |
| 2010/0052431 A1* | 3/2010 | Mita | B60L 11/182 307/104 |
| 2010/0117596 A1* | 5/2010 | Cook | B60L 11/182 320/108 |
| 2010/0156191 A1* | 6/2010 | Dozier | H02J 3/38 307/81 |
| 2011/0148214 A1 | 6/2011 | Dahlen | |
| 2012/0049638 A1* | 3/2012 | Dorn | H02J 3/42 307/87 |
| 2012/0139361 A1* | 6/2012 | Lombardi | G01R 29/18 307/113 |
| 2012/0175876 A1* | 7/2012 | Pendray | F02D 19/02 290/41 |
| 2012/0205986 A1 | 8/2012 | Frampton et al. | |
| 2013/0027077 A1 | 1/2013 | Oughton, Jr. et al. | |

OTHER PUBLICATIONS

International Search Report and Written Opinion cited in EP14171973, dated Feb. 26, 2015.
Chinese Office Action for Chinese Patent Application No. 201410352845.7 dated Sep. 26, 2016.
European Official Action for related European Application No. 14 171 973.2 dated Mar. 29, 2016 with English Translation.

* cited by examiner

US 9,787,099 B2

AUTOMATIC DIAGNOSIS OR REPAIR FOR A GENERATOR CONTROLLER

TECHNICAL FIELD

This disclosure relates in general to parallel generators, or more particularly, to the discovery of and/or correction of connection errors in parallel generators.

BACKGROUND

Parallel generators are connected to supply power to a home, business, vehicle, or another entity. The parallel generators may be turned on in the event of a failure of the utility company. A parallel system of generators may also be the primary source of power, such as for example, in remote locations or in vehicles.

Parallel generators offer numerous advantages over single generators. The redundancy of parallel generators provides a system with consistency and reliability. If one of the parallel generators malfunctions, the load is redistributed to the other generators immediately. The redundancy also allows maintenance and repair at one of the generators without disrupting the supply from the paralleled generators. A system of parallel generators may be expanded incrementally as needs of the system increase.

The parallel system of generators may be connected to a bus. If any of the generators are connected in error, the generators may malfunction, create a hazard, or be irreparably damaged.

BRIEF DESCRIPTION OF THE DRAWINGS

Exemplary implementations are described herein with reference to the following drawings.

DETAILED DESCRIPTION

The following examples describe a system of parallel generators including one or more engine-generator sets. An engine-generator set, which may be referred to as a generator or a genset, includes an engine and an alternator or another device for generating electrical energy. The generator sets may be electrically coupled through wiring to a bus. A controller, which may be internal to the generator, included in a standalone device, or in another device such as an automatic transfer switch, may automatically detect errors or inconsistencies in the wiring of the generators.

The parallel generators may be single phase generators or three phase generators. In the case of three phase generators, each of the parallel generators may include an output for each of three phases. Accordingly, the bus may include a connection for each of the three phases. The three phases may theoretically have the same voltage levels, but there may be some variation between the voltage levels of the phases. The variation may be insignificant with respect to the load on the system of generators; however, the variation may be used for identification of the phases and distinguishing one phase from another. Accordingly, the controller may distinguish and identify the phases based on detected voltage levels.

The detected voltage levels may be used to detect errors in connections of the phases of the generators. For example, a technician may accidentally connect phase A of a generator to phase B of the bus. The controller for the generator may measure the voltage from phase B of the bus and may identify that the measured voltage from phase B of the bus corresponds to the expected voltage for phase A instead of the expected voltage for phase B. The controller may report the error or automatically correct the error. For example, the error may be automatically corrected by activating a switch that changes the connections for the generator. The switch may be internal to the controller (e.g., through software or other logic) or in another device. In another example, a controller at another generator measures the voltage from the bus for phase A and compares the measured value for phase A to an expected value for phase A from the other generator. Other examples are possible.

Figure 1:
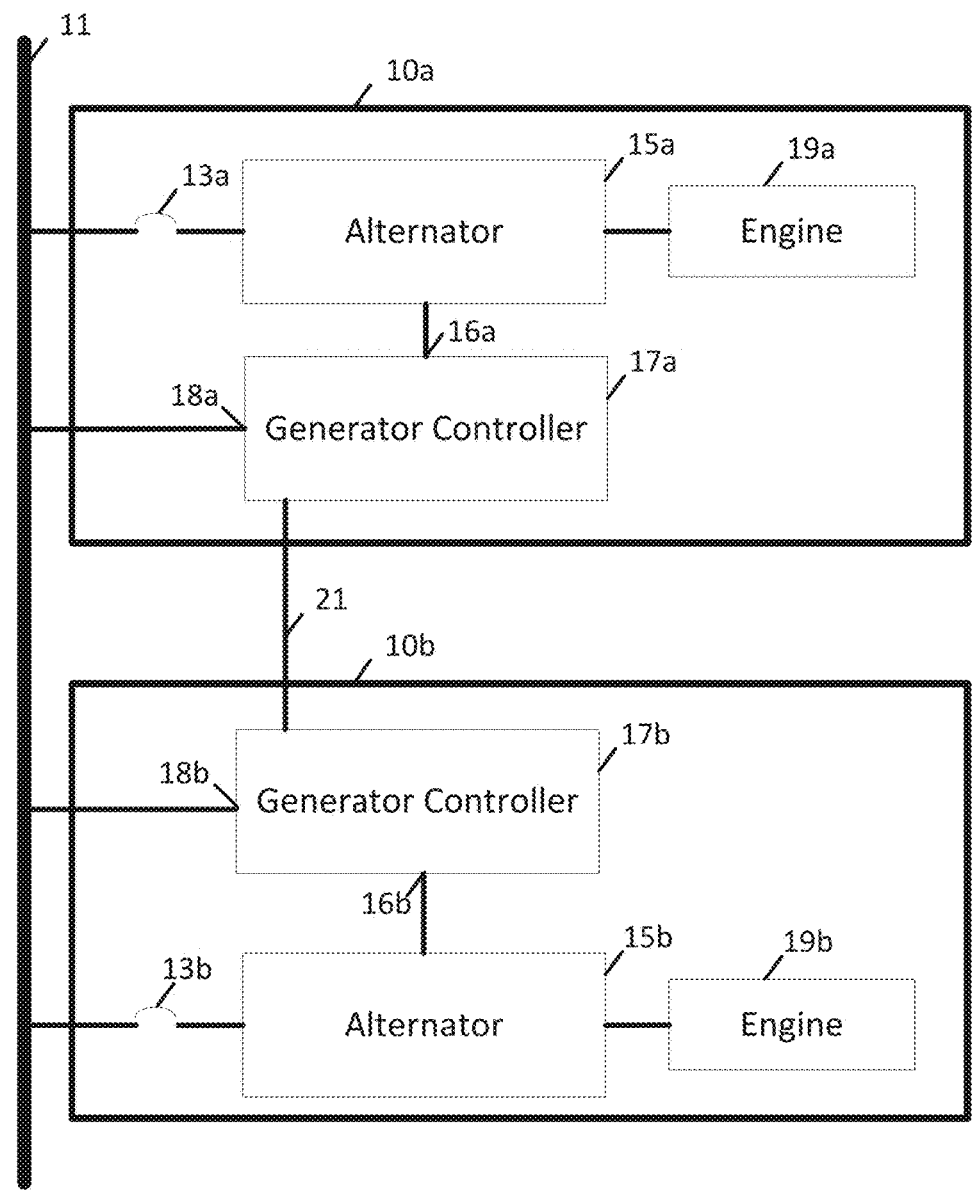
FIG. 1 illustrates an example system of parallel generators.

FIG. 1 illustrates an example system of parallel generators including generator 10a and generator 10b electrically coupled by a bus 11. While two generators 10a and 10b are shown, any number of generators may be connected by the bus 11. Generator 10a may include a circuit breaker 13a, an alternator 15a, a generator controller 17a, and an engine 19a. Generator 10b may include a circuit breaker 13b, an alternator 15b, a generator controller 17b, and an engine 19b. The generator controller 17a and generator controller 17b may be in communication via data connection 21. While shown simplified in FIG. 1, the generators may be three-phase generators and the bus 11 may be a three-phase electrical connection. The bus 11 may include three conductors for three distinct alternating currents that are spaced in time at ⅓ of a cycle from each other.

Each of the generators may include a set of selectively connected inputs. For example, generator controller 17a may include an input 16a in electrical communication with generator 10a through the alternator 15a and an input 18a in electrical communication with the bus 11, and generator controller 17b includes an input 16b in electrical communication with generator 10 through the alternator 15b and an input 18b in electrical communication with the bus 11.

The operation of generator controller 17a and generator controller 17b may be the same or different. In some systems, only one (or less than all) of the generators may be configured for a validation operation for the detection and correction of errors in the configuration of the system of parallel generators. For example, generator controller 17a may be configured to receive a first electrical characteristic from the first input assigned to a connection to the output of the generator 10a. The generator controller 17a may receive a second electrical characteristic from the second input assigned to a connection to the bus 11. Each of the electrical characteristics may be a phase voltage, a phase frequency, a rotation sequence, an angle, a current level, or a power level. For purpose of comparison, the first electrical characteristic and the second electrical characteristic may be in the same units. However, one of the first and second electrical characteristics may be manipulated for comparison with the other characteristic when they do not already have the same units. The connection to the bus 11 and the connection to the generator 10a may be assigned to the same phase of the three phase system.

The generator controller 17a may generate a switching signal based on a comparison between the first electrical characteristic and the second electrical characteristic. When the difference between the first electrical characteristic and the second electrical characteristic is less than a threshold, the switching signal may include data indicative of no errors. When the difference between the first electrical characteristic and the second electrical characteristic exceed the threshold, the switching signal may include data indicative of two or more of the connections for the phases to be connected in error. In the example of a three phase system, in which the phases of the bus should be matched to the phases of the generator ABC-ABC, five errant connections are possible: ABC-ACB, ABC-CBA, ABC-BAC, ABC-BCA, and ABC-CAB. Each of the five errant connections represents either a two-phase (or two-wire) mismatch connection (such as ABC-ACB, ABC-CBA, and ABC-BAC) or a three-phase (or three-wire) mismatch connection (ABC-BCA and ABC-CAB). The switching signal may include data indicative of whether two or all three of the phases are mismatched.

The switching signal may also include a corrective component configured to instruct a switch to correct the errant connection. The switch may be added into the system of parallel generators at any location including connections for the phases. The switch (see, for example, FIG. 3) may be incorporated in either the generator controller 17a or generator controller 17b, integrated with the alternator 15a or the alternator 15b, integrated with the circuited breaker 13a or the circuit breaker 13b, or integrated with the bus 11. The switching signal may control the switch to assign the first input to the second connection or assign the second input to the first connection in response to the difference between the first electrical characteristic and the second electrical characteristic. In the example of two phases being mismatched such as ABC-ACB, the switching signal may assign the input for phase B to the connection for phase C at either the generator or the bus. In the example of three phases being mismatched such as ABC-CAB, the switching signal may include instructions to re-assign all three inputs at either the generator or the bus. In one example, the error is detected at generator 10a but the correction is made at generator 10b. Other examples are possible.

The validation operation for the detection and correction of errors in the configuration of the system of parallel generators may also generate messages for a central administrator or other users. An error message may be generated in response to the difference between the first electrical characteristic and the second electrical characteristic exceeding the threshold. The error message indicates that at least one connection in the system of parallel generators is incorrect. The error message may identify one or more phases associated with the at least one incorrect connection. An accuracy message may be generated in response to the difference between the first electrical characteristic and the second electrical characteristic being less than the threshold. The accuracy message may indicate that at least one of the bus and the generator is operating correctly.

The generator controller 17a, generator controller 17b, or another controller may initiate the validation operation for the detection and correction of errors in the configuration of the system of parallel generators. The validation operation may be compare the current configuration of the system of generators to a past configuration and initiate the validation operation including the switching signal for at least the generator or the bus associated with the current generator configuration.

The alternators 15a and 15b may be electromechanical devices. The alternators 15a and 15b may include a rotating magnetic field and a stationary armature, a rotating armature with a stationary magnetic field, or a linear alternator. The engines 19a and 19b may be powered by gasoline, diesel fuel, or gaseous fuel. The gaseous fuel may be liquefied petroleum gas (LPG), hydrogen gas, natural gas, biogas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the engine. Natural gas (e.g., compressed natural gas (CNG)) may be a hydrocarbon gas mixture. Biogas may be a gas produced by the breakdown of organic material.

Figure 2:
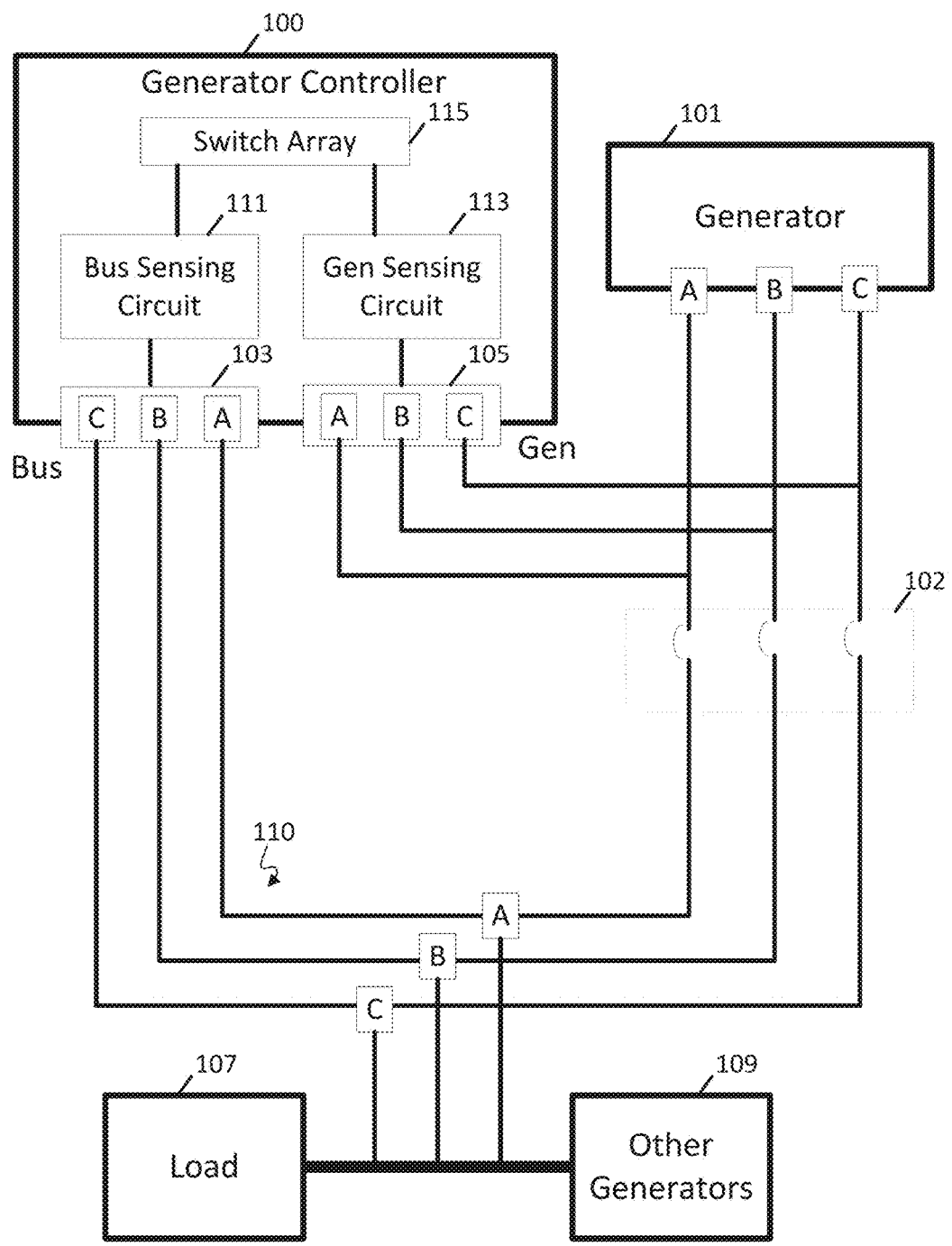
FIG. 2 illustrates an example generator controller and bus for the system of FIG. 1.

FIG. 2 illustrates an example generator controller 100 and bus 110 for the system of FIG. 1. The generator controller 100 includes a bus sensing circuit 111, a generator sensing circuit 113, and a switch array 115. The generator controller 100 also has a generator set of inputs 105 and a bus set of inputs 103. While not shown, the switch array may also include a set of outputs for the generator and/or a set of outputs for the bus. The generator controller 100 may be generator specific (i.e., associated primarily with the generator 101) or associated with the system of parallel generators (i.e., generator 101 and other generators 109). FIG. 2 also illustrates a load 107 on the system of parallel generators.

The generator controller 100 may detect a need for the validation operation through a detection operation. During the detection operation, the generator controller 100 may receive status signals from one or more generators. In one example, the generator controller 100 analyzes the status signal for only generator 100. In this example, each generator controller may detect configuration changes for the respective generator. Alternatively, the generator controller 100 may analyze the status signals from multiple generators. The generator controller 100 may be an aggregate controller for the system of parallel generators or the generator controller 100 may be associated with a specific generator but designated as the master controller. In a redundant system, multiple generator controllers may analyze the status signals from all of the generators.

In any of these examples, the generator controller 100 may monitor the generator 101 to determine whether a configuration of the system of parallel generators has changed. The configuration may be considered changed when an arrangement of the parallel generators has changed, an individual generator has changed, an electrical characteristic of one or more of the generators has changed, or an abnormal condition exists. The arrangement of the parallel generators may be the quantity of generators. For example, the detection operation determines when a generator is added or removed from the system of parallel generators.

Individual generator changes may include the instance when the generator 101 is moved. In one example, the generator 101, or generator controller 100, includes positioning circuitry. The positioning circuitry may include a Global Positioning System (GPS), Global Navigation Satellite System (GLONASS), or another type of position sensor for generating data indicative of the location of the generator 101. Alternatively, the position sensor may involve cellular triangulation, Wi-Fi positioning, radio frequency identification (RFID), or combinations of these or other systems. The positioning system may also include an accelerometer in the generator 101 or the generator controller 100. The accelerometer is operable to detect changes of translational and/or rotational movement of the generator 101. The generator controller 100 may monitor any of these types of data to determine movement of the generator 101.

Individual generator changes may include the instance when a component of the generator 101 has changed. Indicators of a change in component may include the serial number of the generator 100, the model number of the generator 101, the serial number of an engine control unit, the model number of the engine control unit, a battery change, or a system reset. The generator controller 100 may be configured to receive and store data indicative of the model number and/or serial numbers of the generator 101 and/or engine control unit for the generator 101. The generator controller 100 may monitor a battery level to identify when the battery has been disconnected or is changed. The generator controller may detect a system reset signal, which could be a secondary indicator of any type of change on the individual generator. When a change is detected, the generator controller 100 may generate a command message to initiate the validation operation.

An abnormal condition may exist when a generator has failed, a protective relay fault has been tripped, an overcurrent condition exists on the breaker, an excessive current is detected on the alternator, or an excessive load is detected on the generator.

An electrical characteristic of one or more of the generators may be determined to have changed when the electrical characteristic deviates from an average value by a predetermined variation. The predetermined variation may be a percentage of the average value (e.g., 1%, 3%, 5% or another value) or dependent on the variation in the data (e.g., 0.5 standard deviations, 1 standard deviation, or another value). The electrical characteristic may be a phase, voltage or frequency. A significant change in phase, voltage or frequency may indicate that a generator has been changed or reconfigured. In response to the significant change, the generator controller 100 is configured to generate a command message to initiate the validation operation. For generator 101, the generator controller 100 may monitor the phase, voltage, or frequency through the generator sensing circuit 113. When a change in the electrical characteristic is detected, the generator controller 100 may generate a command message to initiate the validation operation.

The generator sensing circuit 113 may take samples from the set of inputs 105 during both the detection operation and the validation operation. However, the generator sensing circuit 113 may be configured to sample the data in different rates depending on whether the generator controller 100 is in the detection operation mode or the validation operation mode. A low sample rate may be used for the detection operation. The low sample rate is lower than the high sample rate. The low sample rate may be one data sample every minute, every hour, or another sample rate. The high same rate may be every second, ten samples per second, or another sample rate.

The validation operation may be performed when the breaker has been closed for at least one generator. The generator controller 100 may generate a request for a bus voltage reading. The request for the bus voltage reading may be sent to the bus sensing circuit 111 or to one or more other generator controllers.

When the breaker is closed, the electrical characteristics sampled at the generator sensing circuit 113 should match the electrical characteristics sampled at the bus sensing circuit 111. For example, the generator controller 100 may receive a first electrical characteristic from the generator 101. The generator controller 100 also may receive a second electrical characteristic from a component of a power source such as the bus 110. The component of the power source corresponds to another generator (e.g., other generators 109).

If all connections were made correctly, the first electrical characteristic substantially equals the second electrical characteristic. The term substantially equal means equivalent within a predetermined tolerance. The tolerance may be a percentage of the value of the first electrical characteristic or the value of the second electrical characteristic. The predetermined tolerance may be configurable. Example tolerances include 1%, 5%, or 10%. The generator controller 100 is configured to perform a comparison between the first electrical characteristic and the second electrical characteristic. When the comparison between the first electrical characteristic and the second electrical characteristic indicates that first electrical characteristic and the second electrical characteristic are not substantially equal, the generator controller 100 generates a command signal to modify a connection associated with the first electrical characteristic and the first component to a second component of the power source.

The command signal may be internally implemented or externally implemented. An externally implemented command signal is sent to another device in order to modify one or more connections for the system of parallel generators. For example, the command signal may be sent to the generator 101 to reconfigure the output of the generator 101. An internally implemented command signal is sent to the switch array 115. The switching array 115 may reconfigure the connections between the generator 101 and the bus such that any phase from the generator 101 may be connected to any phase on the bus.

In one alternative, the function of the switching array 115 may be performed at bus switch 102. In another alternative, the bus switch 102 may complement the switch array 115. For example, the switch array 115 may generate a command (e.g., switch signal) to instruct the bus switch 102 to reassign one or more phases of the generator 101 to a respective connection on the bus.

Figure 3A:
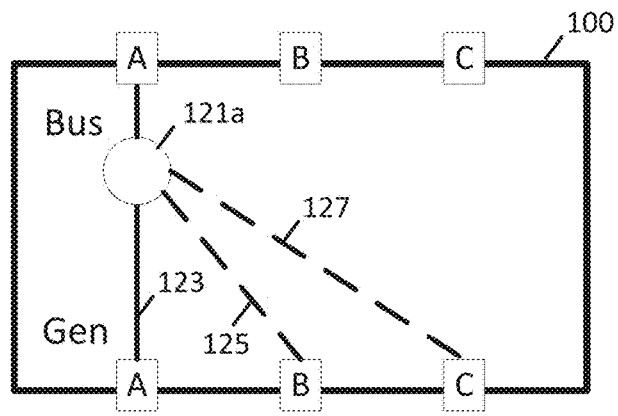
FIGS. 3A-3C illustrate an example array of switches for the generator controller of FIG. 2.
Figure 3B:
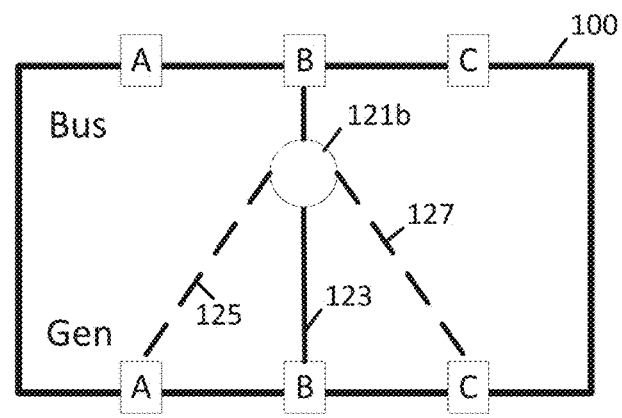
Figure 3C:
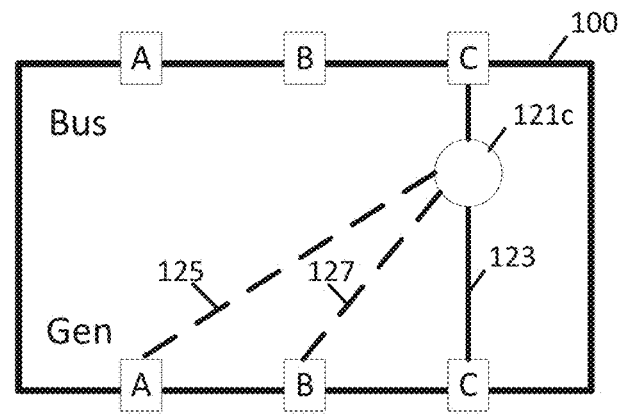

FIGS. 3A-3C illustrate an example array of switches for the switch array 15 of the generator controller 100 of FIG. 2 or one of the other switches described herein. FIGS. 3A-3C illustrate different layers of the switch that may coexist in the switch array 15. The switch array 15 allows any one of the phases of the bus (A, B, C) to be selectively connected to any one of the phases of the generator (A, B, C). In FIG. 3A, switch 121a is configured to move phase A of the bus from the connection 123 with phase A of the generator to either connection 125 with phase B of the generator or connection 127 with phase C of the generator. In FIG. 3B, switch 121b is configured to move phase B of the bus from the connection 123 with phase B of the generator to either connection 125 with phase A of the generator or connection 127 with phase C of the generator. In FIG. 3C, switch 121c is configured to move phase C of the bus from the connection 123 with phase C of the generator to either connection 125 with phase A of the generator or connection 127 with phase B of the generator.

Figure 4:
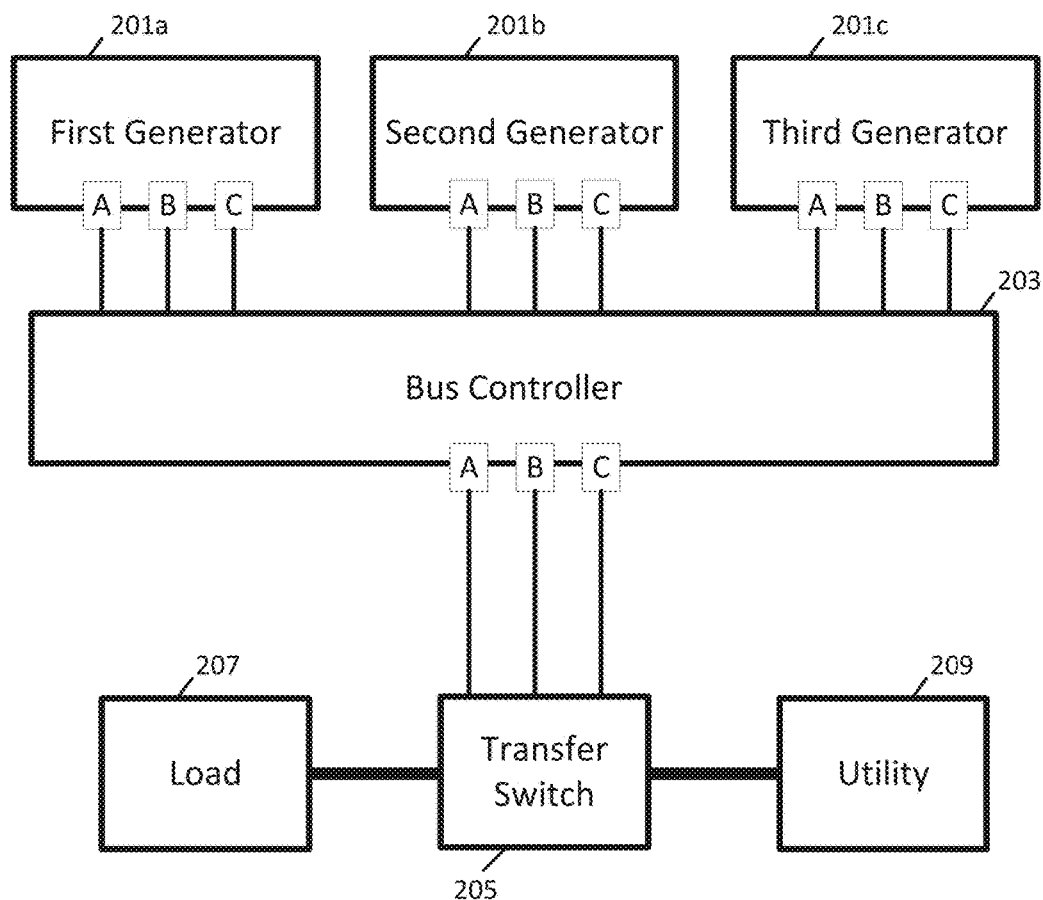
FIG. 4 illustrates another example system of parallel generators.

FIG. 4 illustrates another example system of parallel generators including a first generator 201a, a second generator 201b, and a third generator 201c. Each of the generators 201a-c may include a generator controller. The generator controller may include the features and configurations described above or may be simplified. The generators 201a-c may be in communication with a bus controller 203 and a bus. The transfer switch 205 selectively connects a load 207 to the system of parallel generators 201a-c or to the utility 209. The bus controller 203 may perform an iterative process for automatically detecting changes in the generators 201a-c and validating the connection of the generators 201a-c. Alternatively, the following examples may be performed by one of the generator controllers, acting as a master controller.

In one example, the bus controller 203 may read the bus. The bus controller 203 may read the bus, for example, by taking a voltage or current measurement from the bus. The bus controller 203 may determine that the bus is dead when a substantially zero voltage or current measurement is received. A dead bus means that no generators or other power sources are connected to the bus.

The bus controller 203 may read the bus voltage from all of the generator controllers. The bus voltage is what the respective generator controllers detect from the bus. The bus controller 203 may receive a data signal from each of the generator controllers that includes a voltage reading for phase A of the bus, phase B of the bus, and phase C of the bus.

The bus controller 203 may also determine whether any of the generators have a closed circuit breaker. The bus controller may receive a data signal from each of the generator controller that includes a status of the circuit breaker. If one or more of the generators is connected to a closed circuit breaker, but the bus is dead, then another wiring problem likely exists. In response to the indication of the closed circuit breaker, the bus controller 203 may generate an error message.

In response to an indication of no closed circuit breakers to the dead bus, the bus controller 203 may proceed to close an initial one of the generators 201a-c to the dead bus. The initial generator may be selected according to a predetermined pattern (e.g., X-Y-Z) or randomly. The initial generator may be selected according to ready messages. That is, the first generator controller that sends a ready message to the bus controller 203 is selected as the initial generator controller. When the initial generator is connected to the bus (e.g., the circuit breaker of the initial generator is closed), the bus is energized. The initial generator may be selected according to a first-on algorithm for synchronizing parallel generators. One of the generators may be assigned a token, which the first generator sends to another generator after the first generator has successfully closed to the bus. The second generator and any subsequent generators repeat the token procedure.

Once the bus is energized, the bus controller 203 may be configured to perform the validation operation. Alternatively, the bus controller 203 may instruct two or more of the generators 201a-c to connect to the bus before performing the validation operation.

In the validation operation, the bus controller 203 is configured to compare metered values from the bus to metered values from one of the generators. The generator may be the initial generator or any of the generators reporting voltage levels to the bus controller 203. When the bus controller 203 determines that the metered values from the bus and the metered values from one of the generators are substantially identical, the bus controller 203 indicates that the live bus sensing is accurate. Accordingly, the bus controller 203 may record an event log of the successful test or generate a display message indicative of the successful test for a control panel.

When the bus controller 203 determines that the metered values from the bus and the metered values from one of the generators differ by more than a threshold, the bus controller 203 indicates that a connection error has occurred. Accordingly, the bus controller 203 may record an event log of the unsuccessful test or generate a display message indicative of the unsuccessful test for the control panel.

The bus controller 203 may also notify the other generators of the result of the test. The notification may instruct the other generator controllers that a live bus should now be detectable. The other generator controllers may report detected electrical characteristics of the bus to the bus controller 203. The bus controller 203 (or respective generator controllers) may determine that an error exists if any of the other generator controllers cannot detect the live bus.

The bus controller 203 may finalize the validation operation by disconnecting the generator that successfully passed the test. The bus controller 203 may disconnect the circuit breaker for the tested generator and validate that the voltage or current of the bus is substantially zero. Optionally, the bus controller 203 may also instruct the other generator controllers to confirm that the bus is dead. If no errors are detect, the bus controller 203 may move to another generator and repeat the above procedure. When all of the generators 201a-c have been successfully tested, the bus controller 203 generates a message that the system of parallel generators are correctly configured.

Figure 5:
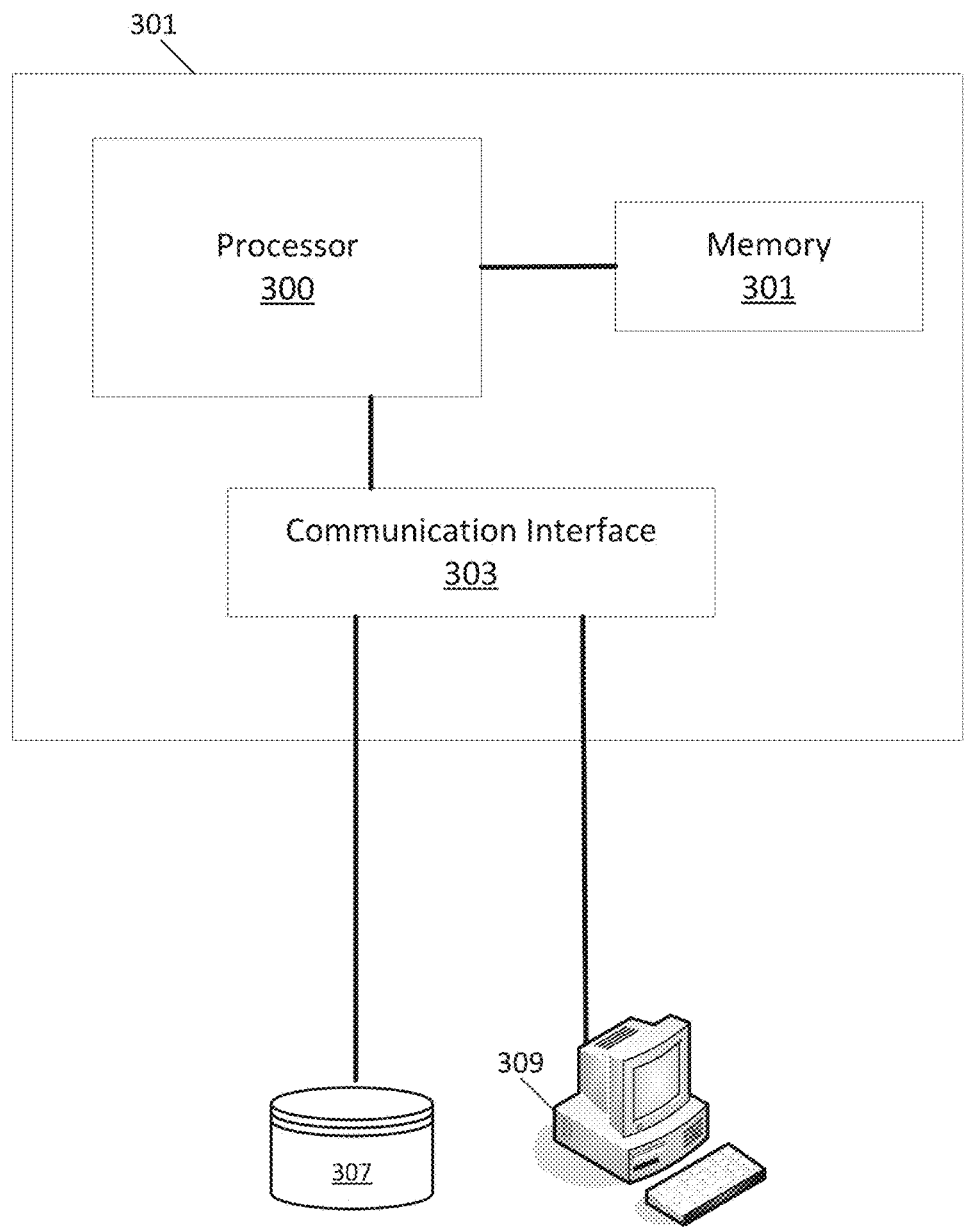
FIG. 5 illustrates an example controller.
Figure 6:
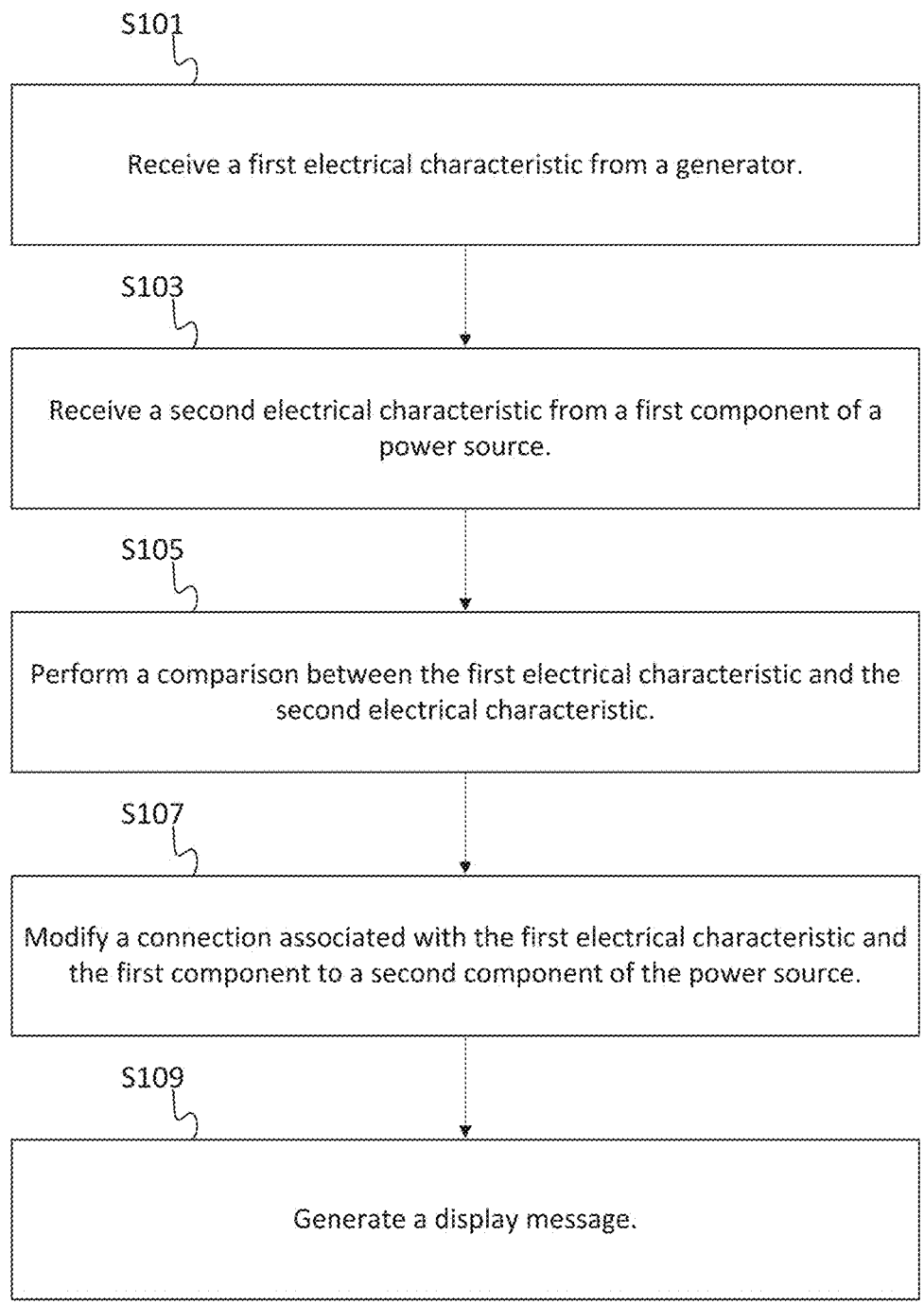
FIG. 6 illustrates an example flowchart for at least one of the controllers of FIGS. 1-5.

FIG. 5 illustrates an example controller 301 (e.g., generator controller 101, or bus controller 203). The controller 301 includes at least a processor 300, a memory 301, and a communication interface 303. The controller 301 may be connected to an external device 309 (control panel or workstation) and/or a database 307. FIG. 6 illustrates an example flowchart of the validation operation for at least one of the controllers of FIGS. 1-5, which is described with respect to the controller 301. Additional, different, or fewer acts may be provided. The acts may be performed in the order shown or other orders. The acts may also be repeated.

At act S101, the controller 301 receives a first electrical characteristic from a generator. The electrical characteristic may be a voltage, a frequency, or a phase angle. The electrical characteristic may be associated with a specific phase of the generator. At act S103, the controller 303 receives a second electrical characteristic from a first component of a power source. The power source may be a bus coupling a series of parallel generators. The power source may be a second generator.

At act S105, the controller 303 performs a comparison between the first electrical characteristic and the second electrical characteristic. The comparison may calculate a difference between the first electrical characteristic and the second electrical characteristic and compare the difference to a threshold. Example thresholds for voltage include 0.5 volts, 1.0 volts, and 5 volts. Example thresholds for frequency include 1 hertz, 5 hertz, and 10 hertz. The absolute value of the difference in phase angle between a generator and the bus may be expected to be 0 degrees, 60 degrees, 120 degrees or 180 degrees. Thus, example thresholds for the difference in the phase angle may be 0-10 degrees, 55-65 degrees, 50-70 degrees, 110-130 degrees, or another range.

At act S107, the controller 303 modifies a connection associated with the first electrical characteristic and the first component to a second component of the power source. The modification is in response to the comparison between the first electrical characteristic and the second electrical characteristic exceeding the threshold. The modification reconfigures the connections of at least one of the generators to the bus. The modification may connect the physical connections in a counterintuitive configuration in order to reverse an error made in the physical connections. For example, the modification may connect phase A of the generator to phase C of the bus, phase B of the generator to phase A of the bus, and phase C of the generator to phase B of the bus.

At act S109, optionally, the controller 303 may generate a display message. The display message may be an error message in response to a difference between the first electrical characteristic and the second electrical characteristic exceeding the threshold. The error message may identify the generator connected in error or the connection associated with the first electrical characteristic and the first component. The generator may be identified by an identification value and a phase label.

The display message may confirm the accuracy of the connections. Such an accuracy message may be generated in response to the difference between the first electrical characteristic and the second electrical characteristic being less than a threshold. The accuracy message may indicate that the bus and the tested generator, or all of the generators, are operating correctly.

In one embodiment, the controller 301 is installed in an automatic transfer switch (ATS). An example ATS is transfer switch 205. For the detection operation, the ATS may include a current transformer that is configured to detect the current of each phase of the bus through inductive sensing. The current for each phase of the bus and for each phase of the generator is an electrical characteristic. A comparison of the currents indicates the direction of the current or the polarity of the current.

The controller 301 may analyze the direction or polarity of each of the phases. When the polarity of one or more phases differs from an expected polarity, the controller may determine that a connection error has occurred. The controller 301 may modify, from within the ATS, connections from one, two or three of the phases to correct the connection error.

Figure 7:
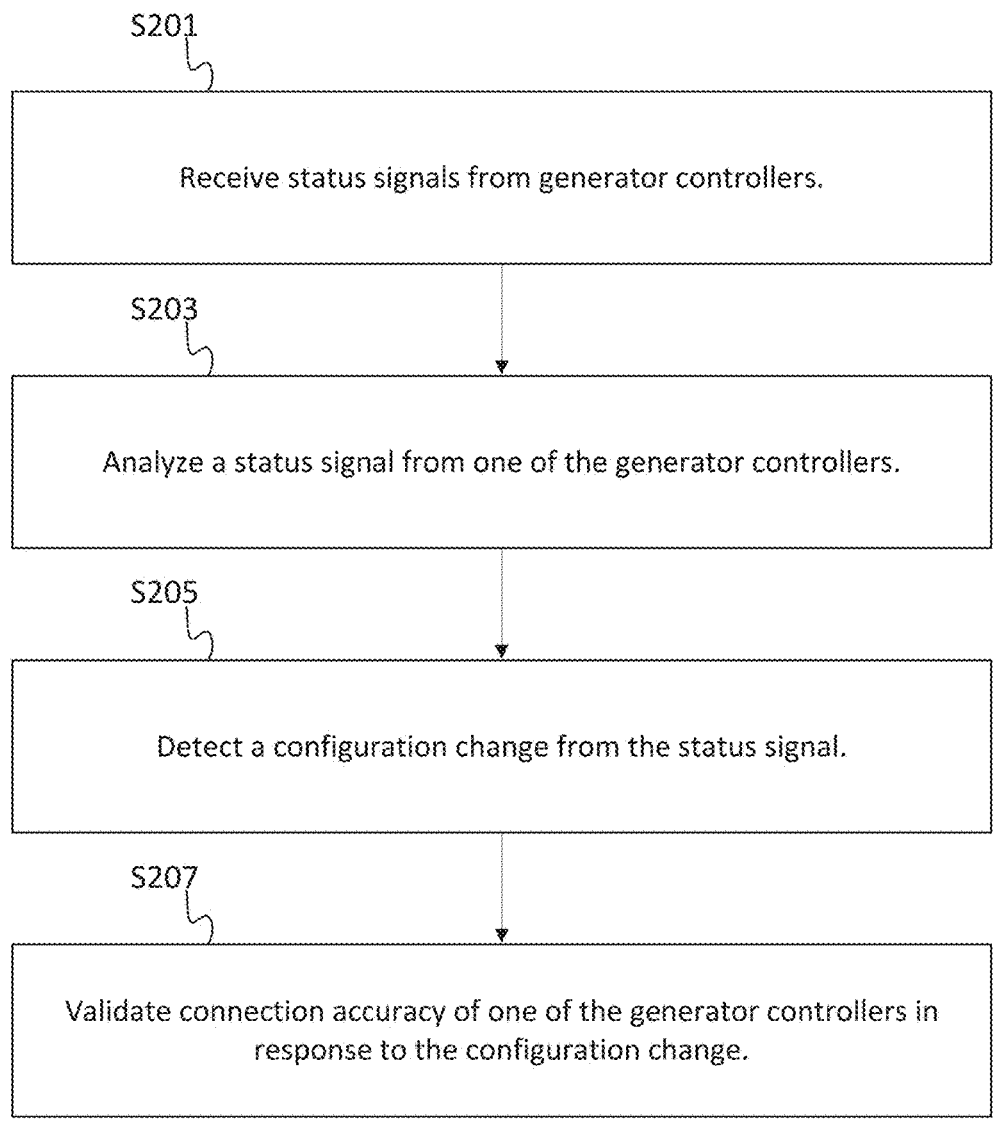
FIG. 7 illustrates another example flowchart for at least one of the controllers of FIGS. 1-5.

FIG. 7 illustrates another example flowchart of the detection operation for at least one of the controllers of FIGS. 1-5, which is described with respect to the controller 301. Additional, different, or fewer acts may be provided. The acts may be performed in the order shown or other orders. The acts may also be repeated.

At act S201, the controller 301 receives status signals from a plurality of generator controllers. The status signals include data indicative of the operation of the generators. The status signals may include identification parameters such as model numbers, serial numbers, or network addresses. The status signals may include running history such as time since last reset or start or the number of starts. The status signals may include an error report including any errors detected locally by the generators.

At act S203, the controller 301 analyzes a status signal from one of the plurality of generator controllers. For example, the controller 301 may extract data from the status signals. At act S205, the controller 301 detects a configuration change from the status signal. For example, the controller 301 is configured to compare a current configuration derived from the status signal to a past configuration stored in memory. The configuration change includes a difference between the current configuration and the past configuration such as a change in serial number, a change in model number, or an abnormal condition from one of the plurality of generators. In addition or in the alternative, the controller 301 may determine when a generator has been removed or added from the set of generators. At act S207, the controller 301 performs the validation operation to validate the connection accuracy of the plurality of generator controller in response to the configuration change, as described in any of the examples herein (e.g., the flowchart of FIG. 6).

Figure 8:
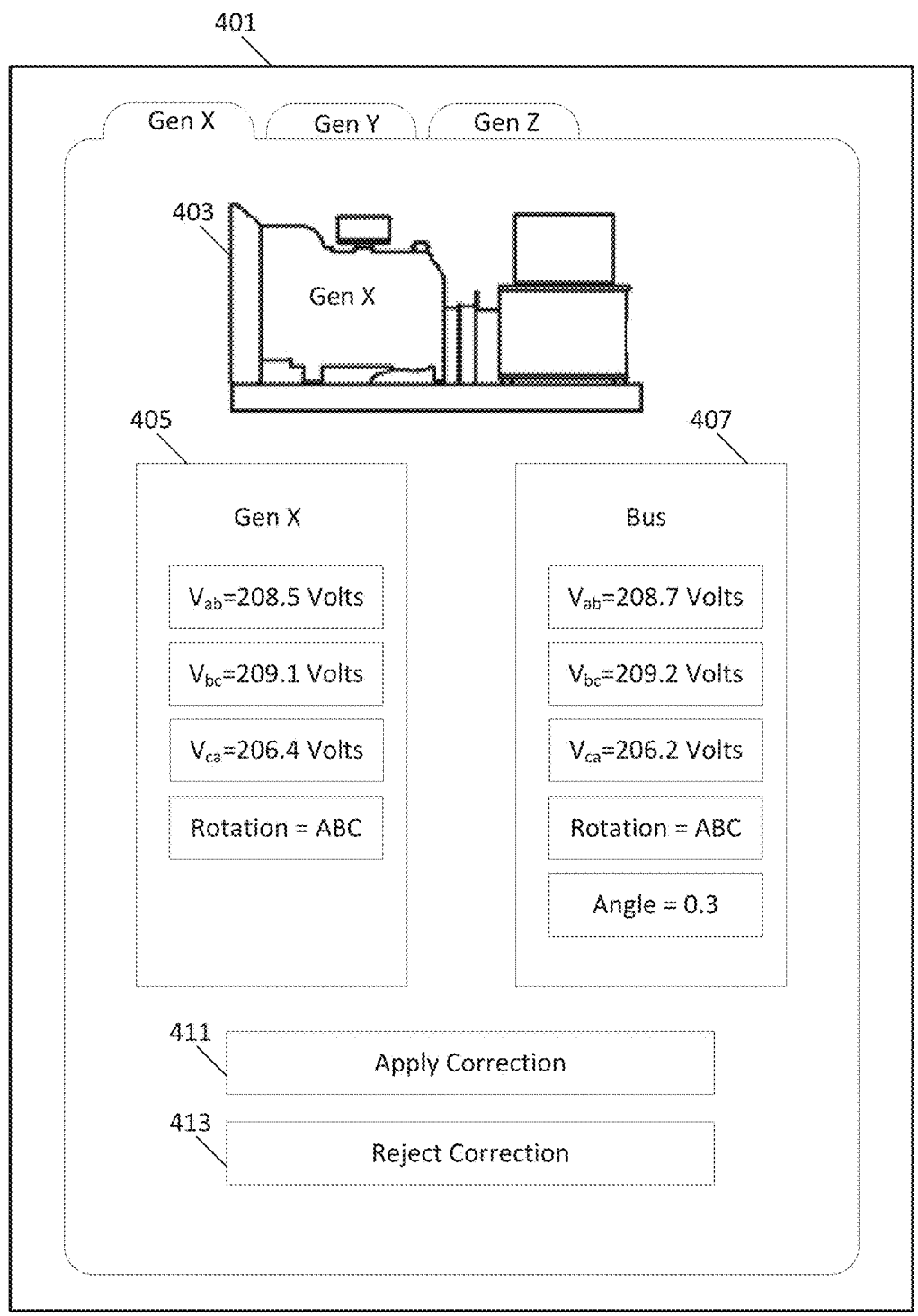
FIG. 8 illustrates an example interface for a generator controller.

FIG. 8 illustrates an example interface 401 for a generator controller. The interface 401 may display the status of one or more generators and any connection errors detected during the validation operations described above. The interface 401 may include a graphical icon 403 indicative of the model of a selected generator. The interface 401 may include a first electrical characteristic window 405 that corresponds to one or more electrical characteristics of the selected generator and a second electrical characteristic window 407 that corresponds to one or more electrical characteristics of the bus. The electrical characteristics of the bus may be received at the bus from another generator. In FIG. 8, the values in the first electrical characteristic window 405 substantially match the values in the second electrical characteristic window 407, indicating no wiring error.

The interface 401 may be configured to include the display messages, error messages, or accuracy messages as described above. An affirmative command button 411 may be configured to receive an input from the user to instruct the generator controller to initiate reconfiguring the generator or bus. The reconfiguration may be made at a central location or by the generator controller for the selected generator. A negative command button 413 may be configured to receive an input from the user to instruction controller to reject reconfiguring the generator.

The interface 401 may also include an event log showing the results of the generator tests along with time stamps and statistical analysis. The interface 401 may include an operating status of the generators, a load status of the generators, or output levels for the generators. The interface 401 may include operation histories for the generators. The operation histories may include the hours of runtime, the number of errors, or the number of starts. The interface 401 may also include breaker status by generator or for each phase of each generator.

Additional electrical characteristics such as frequency, current, power (e.g., kilowatts), a power factor, a total generator bus power (e.g., kilowatts), or other values may be included. The interface 401 may also include mechanical parameters of the engines. The mechanical parameters may include oil pressure, water temperature, battery voltage, engine speed, revolutions per minute of the rotor, or other attributes. Any of the information shown in the interface 401 may be shown numerically or graphically (e.g., radial gauges, bar graphs, or another technique).

Figure 9:
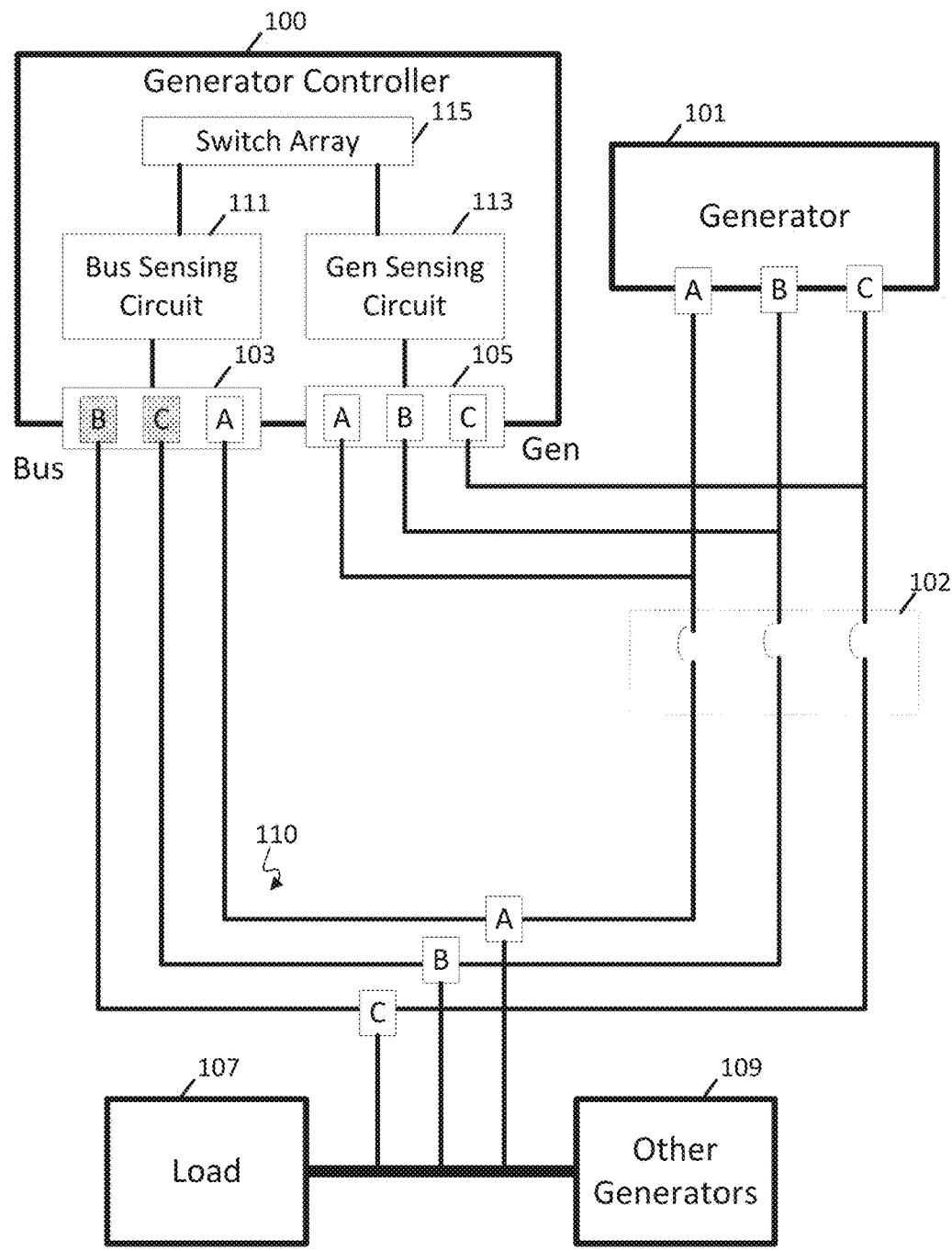
FIG. 9 illustrates the system of FIG. 2 including a connection error.
Figure 10:
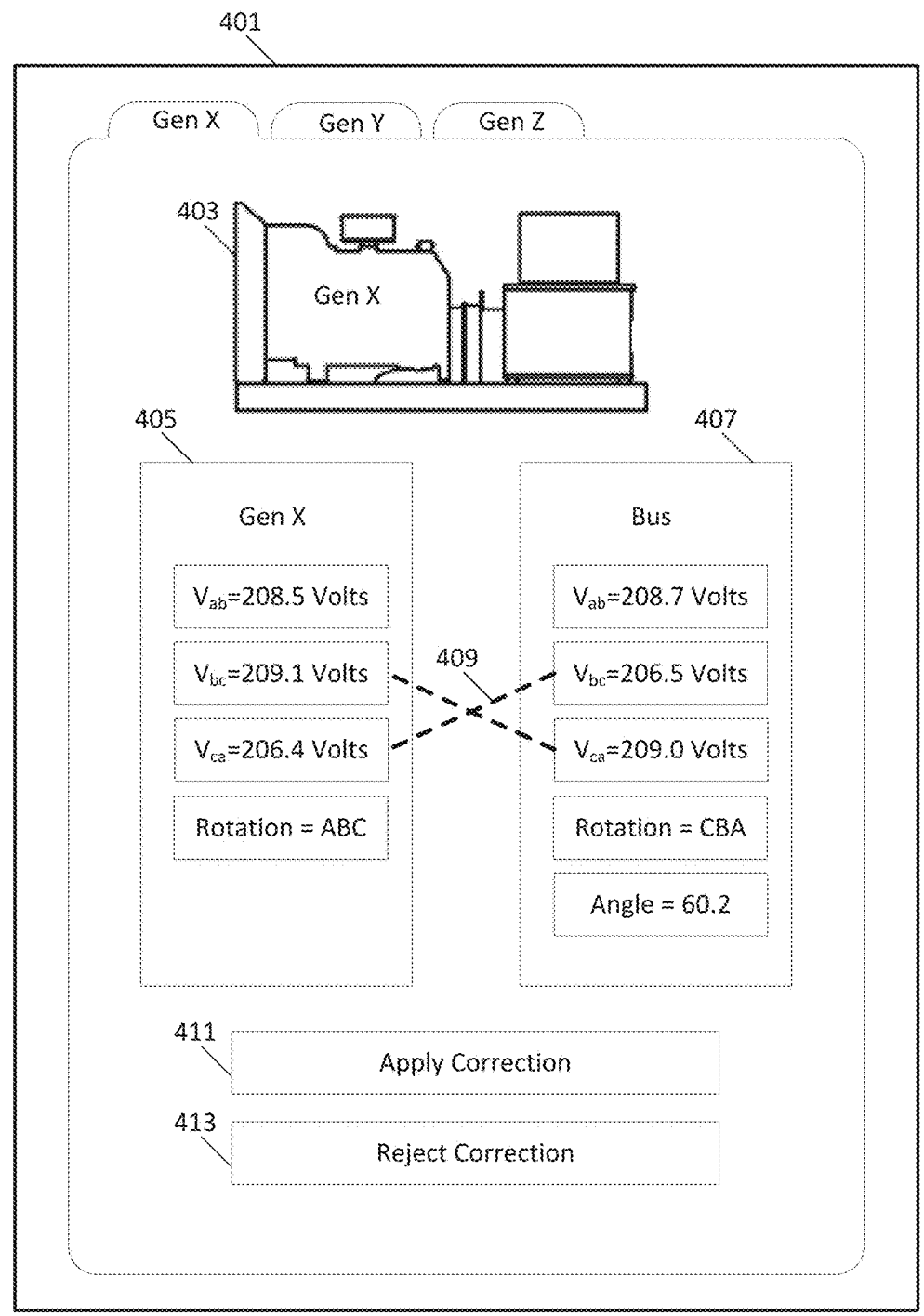
FIG. 10 illustrates the example interface of FIG. 8 representing the connection error of FIG. 9.

FIG. 9 illustrates the system of FIG. 2 including a connection error. As an example, the bus set of inputs 103 has a wiring error. The phase B connection and the phase C connection have been swapped. FIG. 10 illustrates the example interface of FIG. 8 representing the connection error of FIG. 9. In FIG. 9, the values in the first electrical characteristic window 405 and the values in the second electrical characteristic window 407 that correspond to phase B and phase C do not substantially match, indicating a wiring error.

Figure 11:
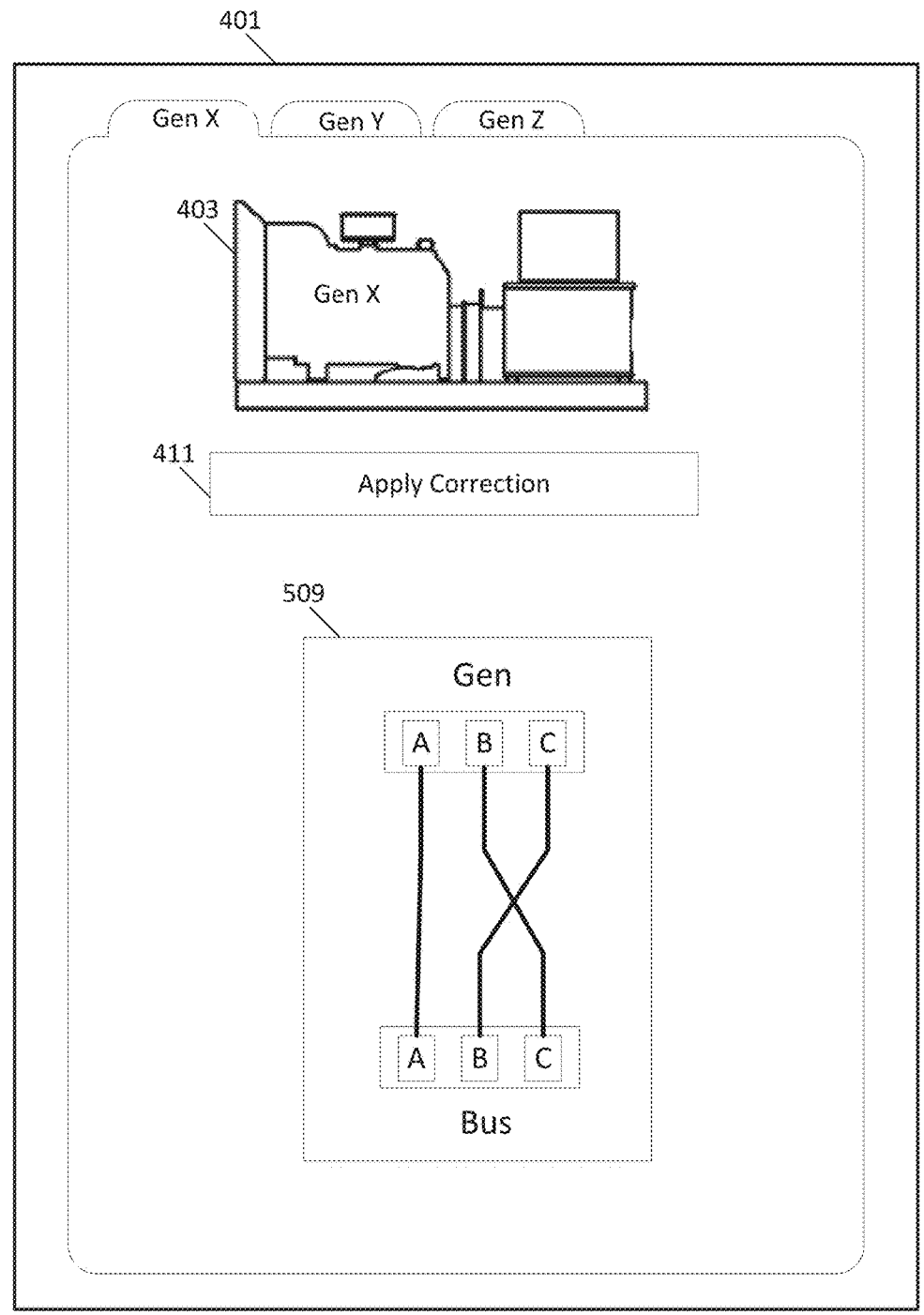
FIG. 11 illustrates the example interface of FIG. 8 representing a correction for the connection error of FIG. 10.

The example shown in FIG. 9 illustrates an error message generated in response to the wiring error. The error message is in a graphical suggestion for a reconfiguration of the selected generator. The graphical suggestion is shown by two dotted lines 409 in FIG. 9. FIG. 11 illustrates the example interface of FIG. 8 representing another graphical suggestion for the connection of the error of FIG. 10. Graphical suggestion 509 illustrates the connections between the bus and the generator and illustrates that the connections for phase B and phase C should be swapped to correct the connection error. The interface 401 may receive a command from the user to apply the correction from the affirmative command button 411.

In another alternative, the switch (e.g., switching array 115 or bus switch 102) may be a mechanical and/or manual switch with a predetermined number of settings. In the case of three phases, each of the settings may correspond to a possible errant wiring pattern. For example, the manual switch may have five settings: ABC-ACB, ABC-CBA, ABC-BAC, ABC-BCA, and ABC-CAB. The user may operate the switch according to the suggestion displayed in the interface 401 to reconfigure the connections of the generator bus. For example, the suggestion displayed on the interface 401 may indicate "ABC-BCA," which is a setting of the manual switch that may be selected by the user.

In another embodiment, the electrical characteristics of two or more generators are tested by running the generators. For example, the first electrical characteristic is a first power level associated with a first generator and the second electrical characteristic is a second power level associated with a second generator. The validation operation may be performed by preliminarily physically connecting the two generators, which may be a normal configuration for a parallel set of generators.

Subsequently, the first generator is instructed by a controller to run at a low speed, and the second generator is instructed by the controller to run at a high speed. The high speed exceeds the low speed. The power output from the generator with the higher target speed should exceed the power output from the generator with the lower target speed. The controller may be configured to monitor power levels of individual phases on the two generators and calculate a first result including a difference in power between the two generators. The difference in power between the two generators may be indicative of the second generator absorbing power from the first generator.

Subsequently, the second generator is instructed by the controller to run at a low speed, and the first generator is instructed by the controller to run at a high speed. The controller may be configured to monitor power levels of individual phases on the two generators and calculate a second result including a difference in power between the two generators. The difference in power between the two generators may be indicative of the first generator absorbing power from the second generator.

If the first result includes power transfer from the first generator to the second generator and the second result includes power transfer from the second generator to the first generator, then no error is present. Accordingly, the controller may be configured to generate an accuracy message.

If either of the first result or the second result includes a substantially zero power level, then a connection is disconnected or another wiring error exists. If the first result includes negative power transfer from the first generator to the second generator and/or the second result includes negative power transfer from the second generator to the first generator, then a connection error is present. Negative power transfer is power transfer in the opposite direction than expected. Accordingly, the controller may be configured to generate an error message identifying the generator(s) or phase(s) in question.

In another implementation, the speeds of the generators are not specifically controlled for the purpose of verifying the connections of the phases to the bus. Instead, the output of the generators may be monitored through normal operation of the generators. For example, the speeds of the generators may be controlled through a feedback process for the purpose of load sharing between generators. The controller may monitor the change in output of one or more of the generators and compare the change to power levels on the bus.

Figure 12:
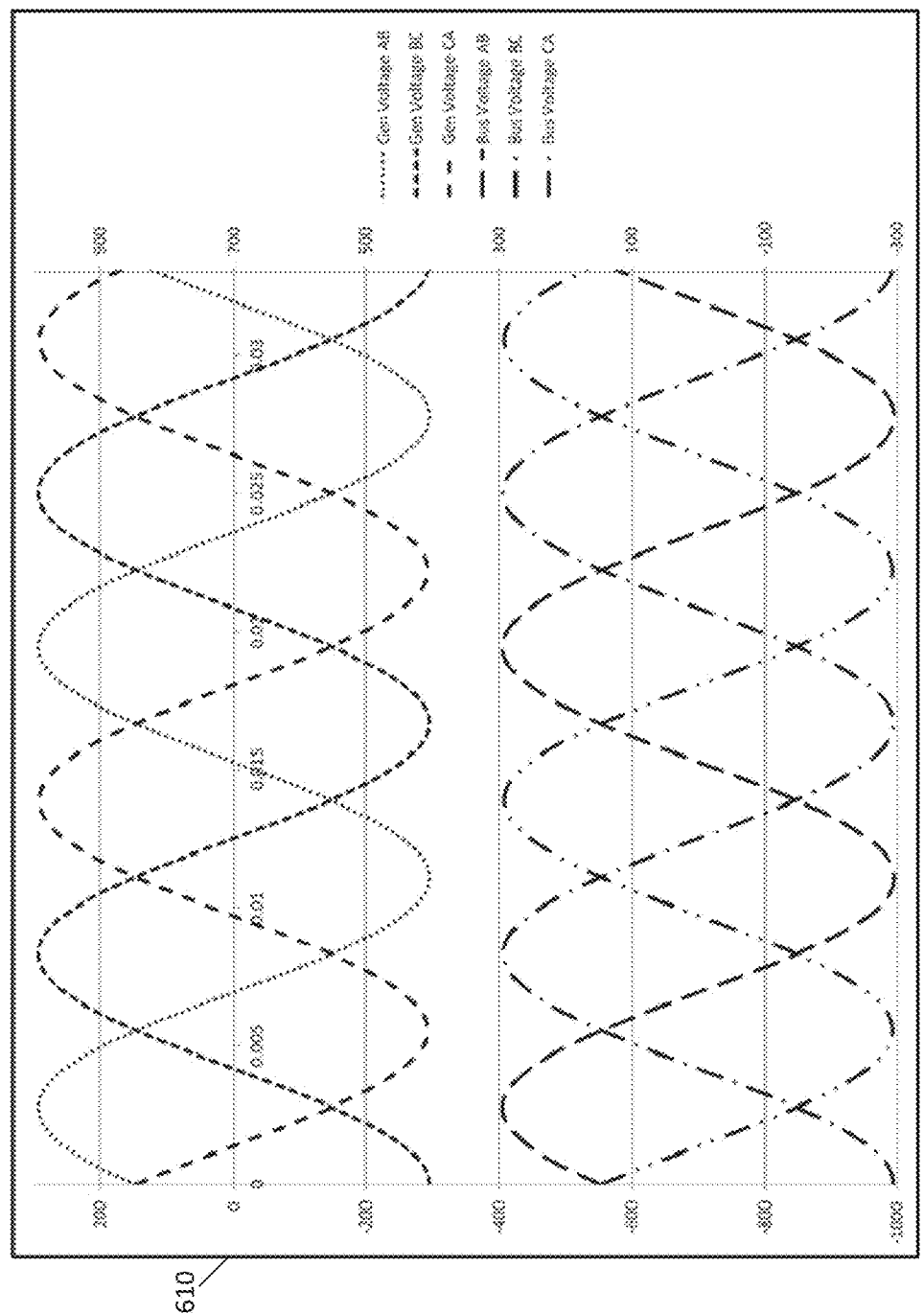
FIGS. 12 and 13 illustrate outputs of a system of generators in a correct configuration.
Figure 13:
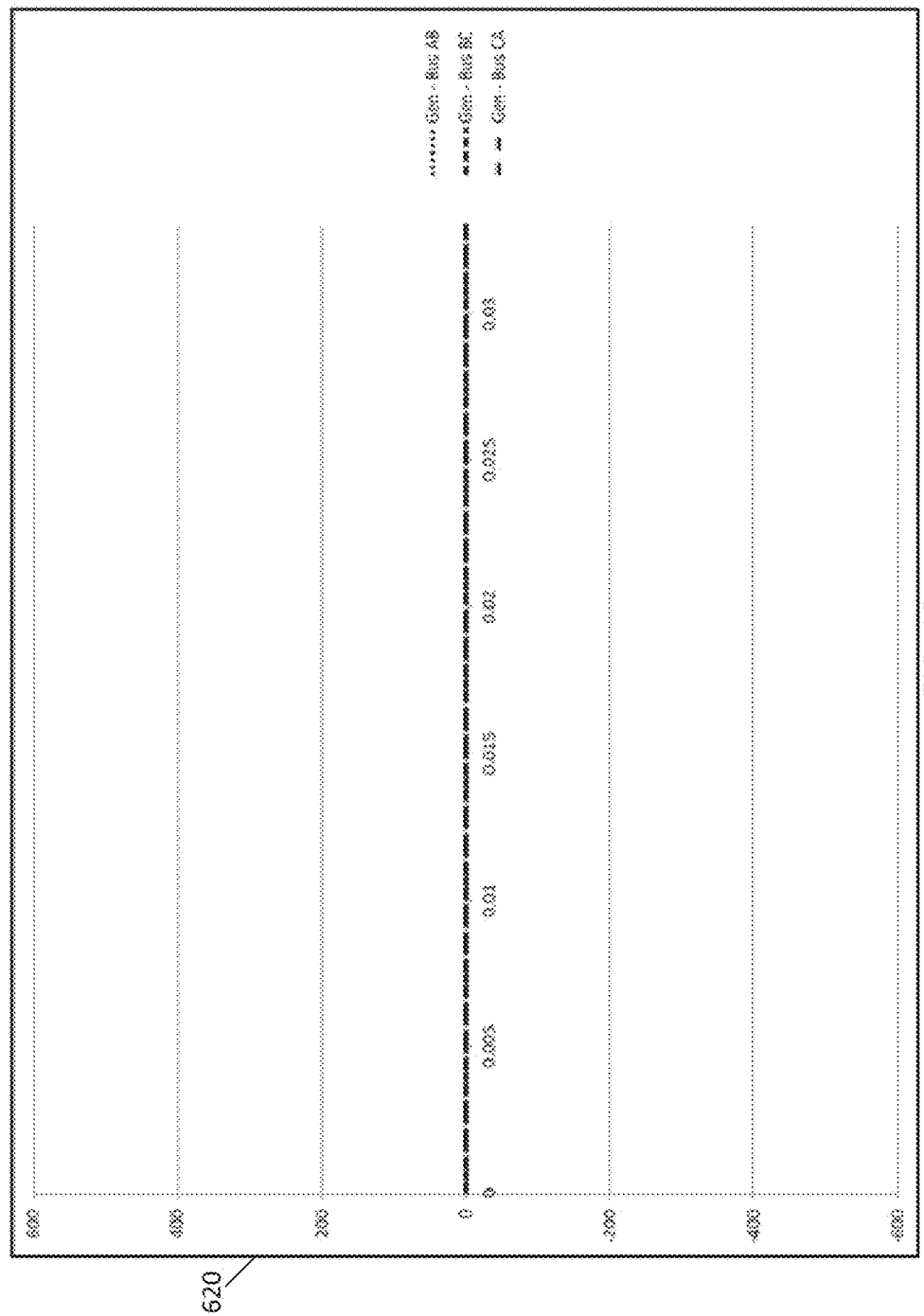

FIGS. 12 and 13 illustrate outputs of a system of generators in a correct configuration, as shown in the wiring diagram of FIG. 2. FIG. 12 illustrates the three generator signals as voltages, Generator Voltage AB, Generator Voltage BC, and Generator Voltage CA plotted with time on the horizontal access and voltage on the vertical access. FIG. 12 also illustrates the three bus signals as voltages, Bus Voltage AB, Bus Voltage BC, and Bus Voltage CA. The three sequential signals are spaced by 120 degrees. The bus waveforms and generator waveforms are identical. Therefore, as shown in FIG. 13, the difference of Generator Voltage AB and Bus Voltage AB expressed as a root mean squared (RMS) quantity is at or near 0 volts. In other words, Generator Voltage AB−Bus Voltage AB=0 VAC, Generator Voltage BC−Bus Voltage BC=0 VAC, and Generator Voltage CA−Bus Voltage CA=0 VAC.

Figure 14:
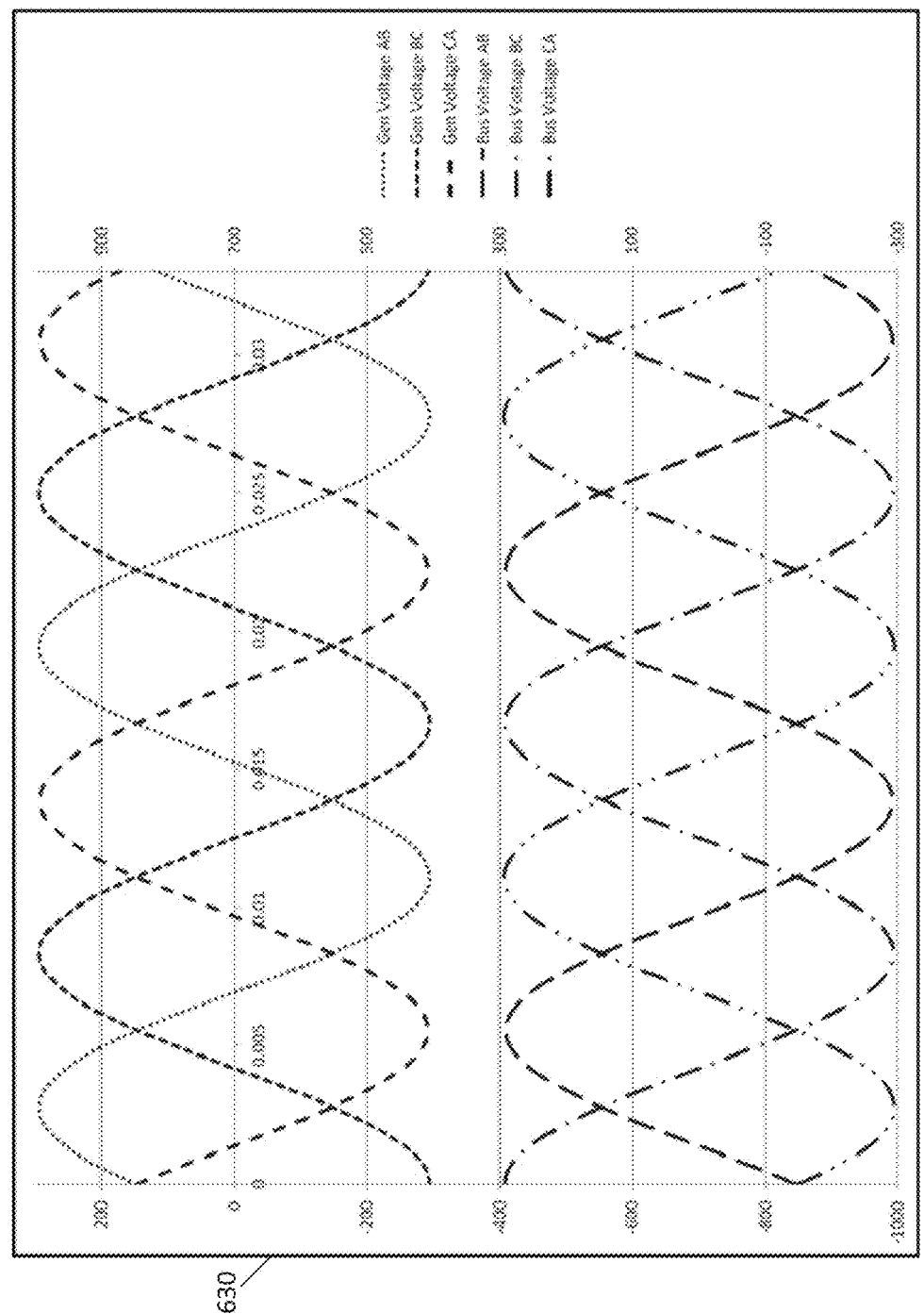
FIGS. 14 and 15 illustrate outputs of a system of generators in an incorrect configuration.
Figure 15:
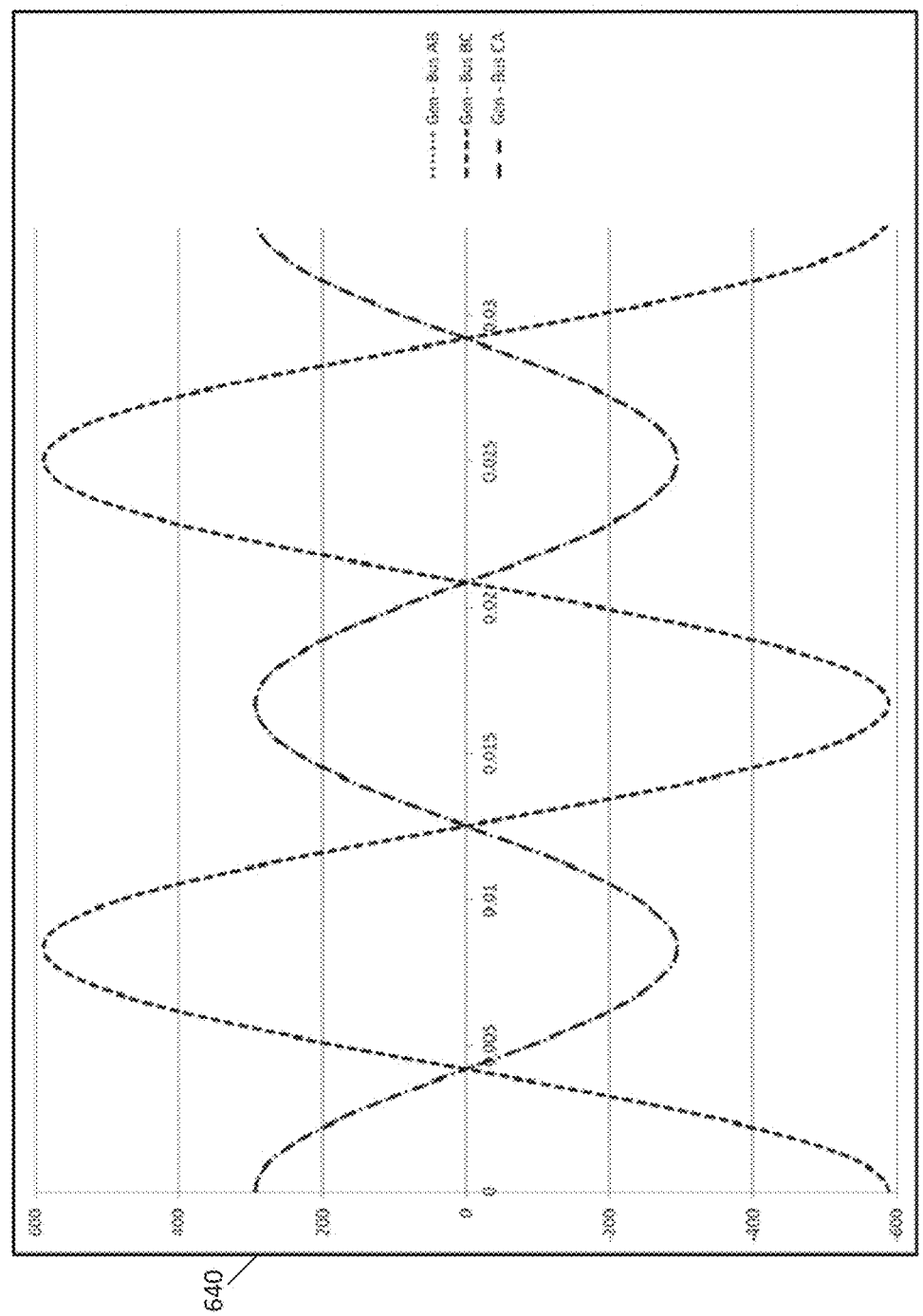

FIGS. 14 and 15 illustrate outputs of a system of generators in an incorrect configuration, for example with phase B and phase C reversed, as shown by wiring diagram of FIG. 9 and illustrated in FIGS. 10 and 11. FIG. 14 illustrates the three generator signals as voltages, Generator Voltage AB, Generator Voltage BC, and Generator Voltage CA plotted with time on the horizontal access and voltage on the vertical access. FIG. 14 differs from FIG. 12 in that the locations of bus voltages no longer align with the generator Voltages. In one sense, the bus voltages have shifted. As a result, as shown in FIG. 15, this has changes the comparison of the generator voltages to the respective bus voltages. The quantities that were at or near 0 volts above have changed. For example, Generator Voltage AB−Bus Voltage AB=121.1 VAC, Generator Voltage BC−Bus Voltage BC=241.4 VAC, and Generator Voltage CA−Bus Voltage CA=119.8 VAC. Because phases B and C have been reversed, the quantity of the difference between Generator BC and Bus Voltage BC is higher than expected. In one example, a voltage quantity that is different than the other two indicates that the two phases for that voltage quantity have been reversed. Other scenarios are possible. The error in wiring may be detected by comparing the measured values from expected values from a table stored in memory. In addition, the sequence in which the phases cross zero may be detected. The detected phase rotations indicate the direction that the generator is rotating. The phase rotations and/or angles between phases may be compared to expected values stored in the table. Other combinations of the voltages, as well as other quantities (e.g., current, power, frequency or other properties) may be included in the table and other comparisons may be made.

The database 307 may include may include templates for the display messages, error messages, or accuracy messages. The database 307 may include settings or possible settings for the thresholds or tolerances. The database 307 may include past configuration for the generations. The database 307 may include a configuration file that specifies one or more of the electrical characteristics to be used in the validation operation or the detection operation (e.g., a phase voltage, a phase frequency, a rotation sequence, an angle, a current level, or a power level). An input device (e.g., external device 309) may input the message templates, thresholds, tolerances, or the configuration file.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The bus controller 203 and one or more generator controller 100 may be connected by network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 301 or database 307) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. An apparatus comprising:
a controller;
a plurality of selectively connected inputs to the controller, the plurality of selectively connected inputs including a first input associated with a generator and a second input associated with a bus; and
wherein the controller is configured to receive a first electrical characteristic from the first input assigned to a first connection and a second electrical characteristic from the second input assigned to a second connection;
wherein the controller is configured to generate a switching signal to internally connect the first input to the second connection or internally connect the second input to the first connection in response to a difference between the first electrical characteristic and the second electrical characteristic exceeding a threshold,
wherein the controller is configured to compare a current configuration to a past configuration and initiate a validation operation including the switching signal for at least the generator or the bus associated with the current generator configuration.

2. The apparatus of claim 1, wherein the controller is configured to generate an error message in response to the difference between the first electrical characteristic and the second electrical characteristic exceeding the threshold.

3. The apparatus of claim 1, wherein the controller is configured to generate an accuracy message in response to the difference between the first electrical characteristic and the second electrical characteristic being less than the threshold, wherein the accuracy message indicates that at least one of the bus and the generator is operating correctly.

4. The apparatus of claim 1, wherein the controller is configured to generate a request for a bus voltage reading from a plurality of generator controllers in response to the bus being inactive.

5. The apparatus of claim 1, wherein the first electrical characteristic and the second electrical characteristic are at least one of voltage, frequency, and phase.

6. A method comprising:
receiving a first electrical characteristic from a generator;
receiving a second electrical characteristic from a first component of a power source;
performing a first comparison between the first electrical characteristic and the second electrical characteristic;
in response to the comparison between the first electrical characteristic and the second electrical characteristic, initiating a validation operation to compare a current configuration to a past configuration to identify an errant connection associated with the first electrical characteristic; and
modifying the errant connection associated with the first electrical characteristic and the first component to internally connect to a second component of the power source.

7. The method of claim 6, further comprising:
in response to a difference between the first electrical characteristic and the second electrical characteristic exceeding a threshold, generating an error message, wherein the error message identifies the generator or the connection associated with the first electrical characteristic and the first component.

8. The method of claim 6, further comprising:
in response to a difference between the first electrical characteristic and the second electrical characteristic being less than a threshold, generating an accuracy message, wherein the accuracy message indicates that at least one of the bus and the generator is operating correctly.

9. The method of claim 6, further comprising:
requesting a bus voltage reading from a plurality of generator controllers in response to the bus being inactive.

10. The method of claim 6, further comprising:
requesting a circuit breaker status signal from a plurality of generator controllers in response to the bus being inactive.

11. The method of claim 6, further comprising:
generating a bus voltage reading; and
sending the bus voltage reading to a plurality of generator controllers.

12. The method of claim 6, further comprising:
connecting a circuit breaker for the generator; and
requesting remote bus voltage readings from the plurality of generator controllers.

13. The method of claim 6, wherein the first electrical characteristic and the second electrical characteristic are at least one of voltage, frequency, and phase.

14. The method of claim 6, further comprising:
receiving status signals from a plurality of generator controllers;
analyzing a status signal from one of the plurality of generator controllers; and
detecting a configuration change from the status signal, wherein the comparison between the first electrical characteristic to the second electrical characteristic is in response to the configuration change.

15. The method of claim 6, wherein the generator is a first generator, the first electrical characteristic is a first power reading associated with the first generator and the second electrical characteristic is a second power reading associated with a second generator, the method further comprising:
instructing the first generator to run at a low speed; and
instructing the second generator to run at a high speed, wherein the threshold is indicative of the second generator absorbing power from the first generator.

16. A method comprising:
receiving status signals from a plurality of generator controllers;
analyzing a status signal from one of the plurality of generator controllers;
detecting a configuration change from the status signal; and
validating connection accuracy of at least one of the plurality of generator controllers in response to the configuration change;
wherein an internal connection for at least one of the plurality of generator controllers is modified based on the validating connection accuracy,
comparing a current configuration derived from the status signal to a past configuration stored in memory, wherein the configuration change includes a difference between the current configuration and the past configuration.

17. The method of claim 16, wherein the configuration change includes a removal a generator for a set of generators, an addition of a generator for the set of generators, a change in serial number, a change in model number, or an abnormal condition from one of the plurality of generator controllers.

18. The method of claim 16, wherein validating operation of the plurality of generator controller comprises:
receiving a first electrical characteristic from a generator;
detecting a second electrical characteristic from a first component of a bus power line;
comparing the first electrical characteristic to the second electrical characteristic; and
in response to a difference between the first electrical characteristic and the second electrical characteristic exceeding a threshold, modifying a connection associated with the first electrical characteristic and the first component to a second component of the bus power line.

* * * * *